No. 800,478. PATENTED SEPT. 26, 1905.
C. O. PALMER.
COAL CUTTING MACHINE.
APPLICATION FILED OCT. 15, 1901.

8 SHEETS—SHEET 1.

Witnesses.
Francis E. Whiting.
Victor C. Lynch.

Inventor:
C. O. Palmer.

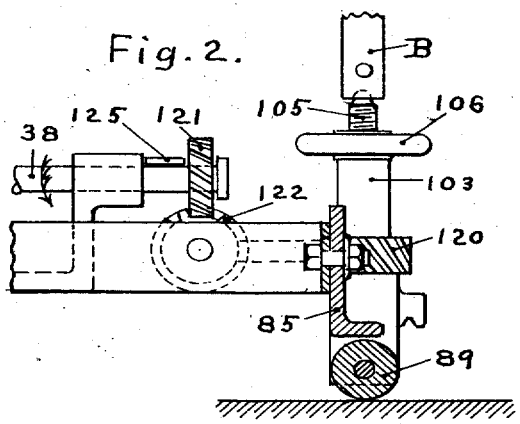
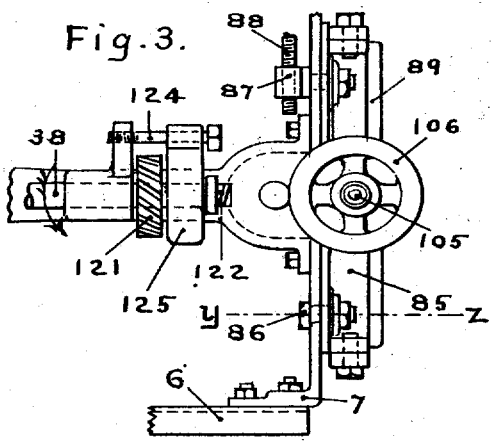
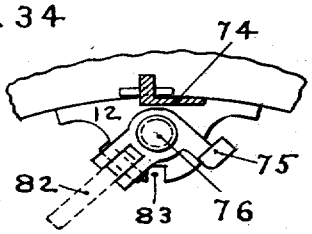
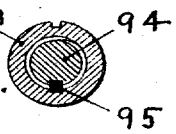

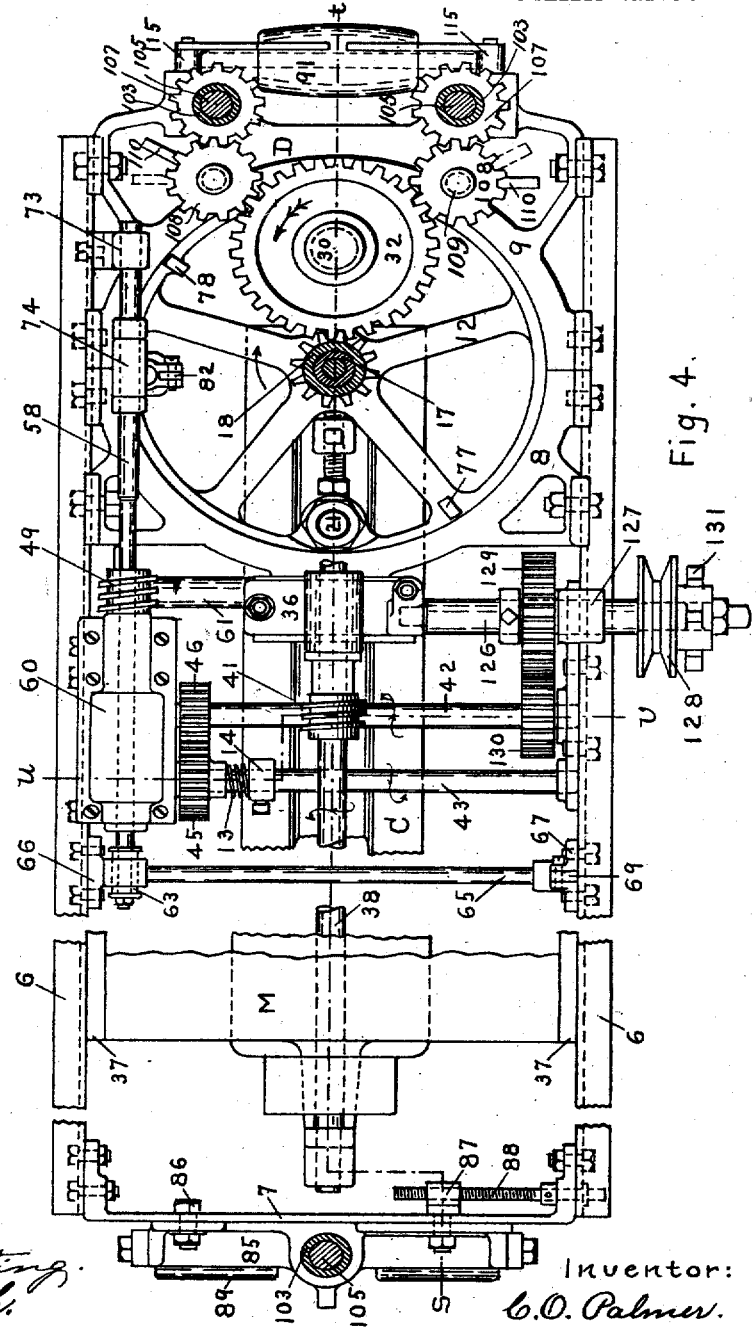

No. 800,478. PATENTED SEPT. 26, 1905.
C. O. PALMER.
COAL CUTTING MACHINE.
APPLICATION FILED OCT. 15, 1901.
8 SHEETS—SHEET 4.
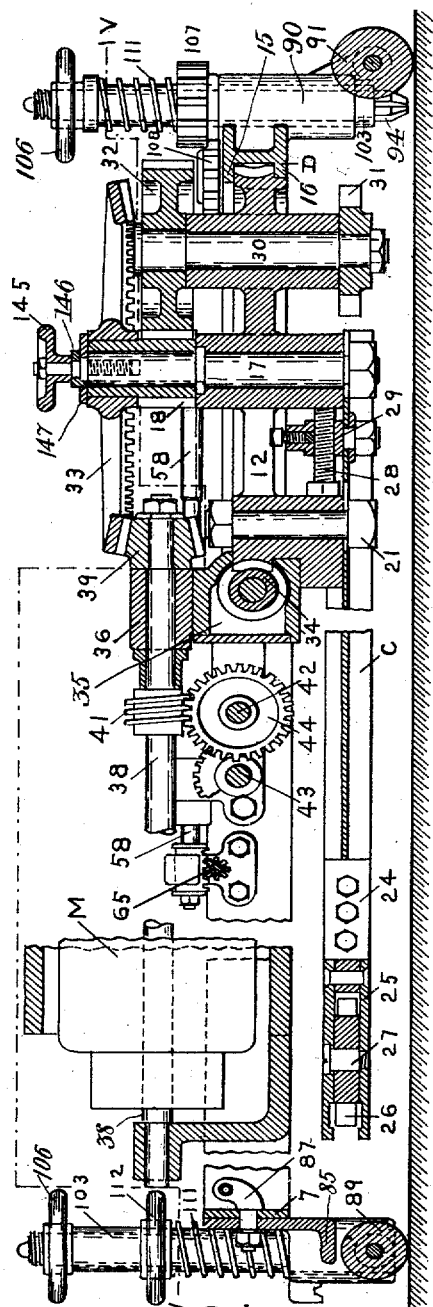
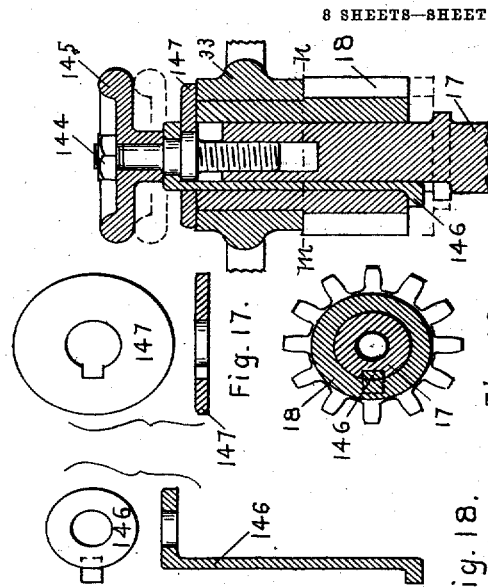
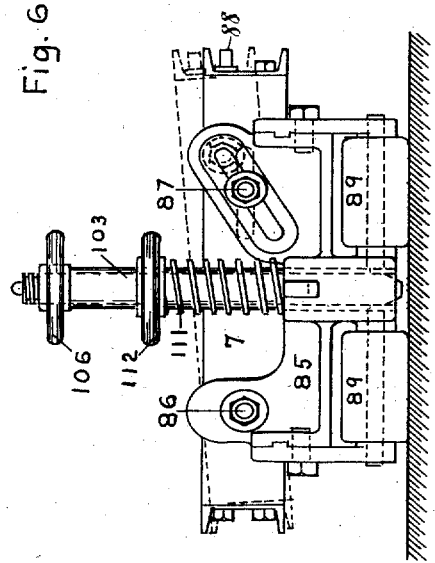
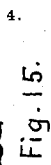
Witnesses: M. P. Stark. Victor C. Lynch.
Inventor: C. O. Palmer.

No. 800,478. PATENTED SEPT. 26, 1905.
C. O. PALMER.
COAL CUTTING MACHINE.
APPLICATION FILED OCT. 15, 1901.
8 SHEETS—SHEET 5.
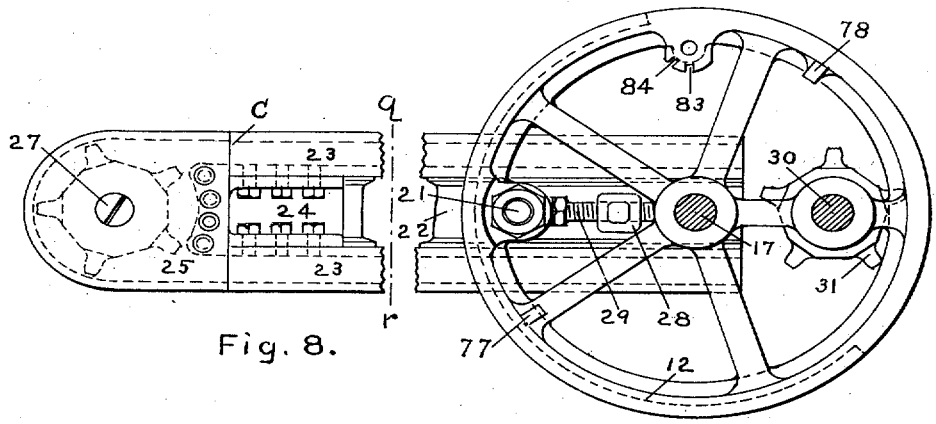
Fig. 8.
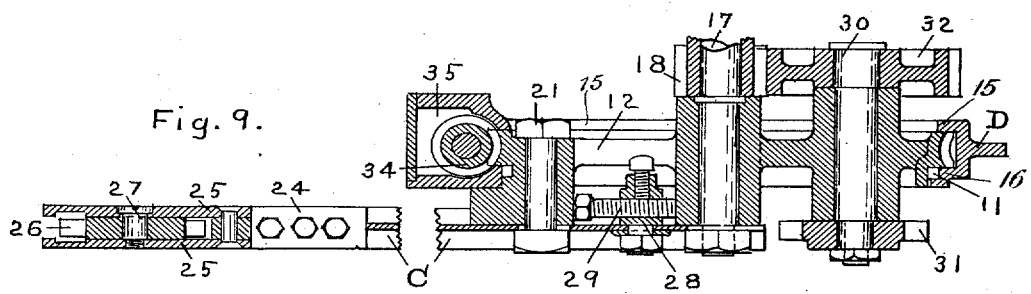
Fig. 9.
Fig. 11.
Fig. 12.
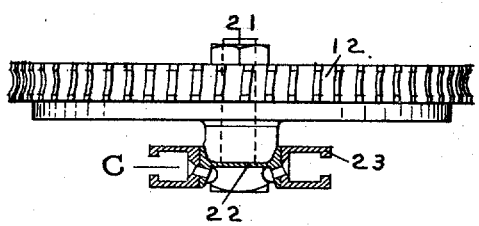
Fig. 10.
Witnesses:
Frances E. Whiting.
Victor C. Lynch.
Inventor:
C. O. Palmer.

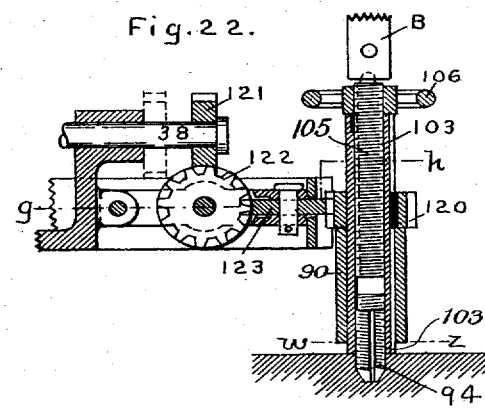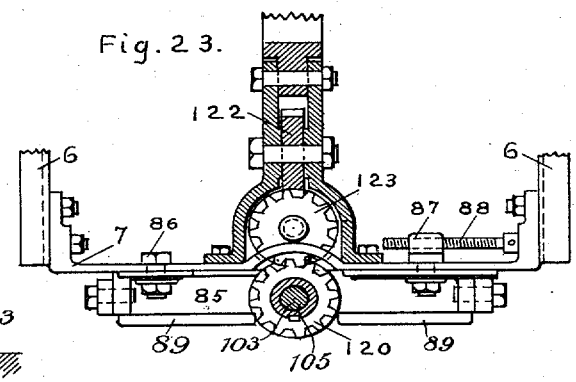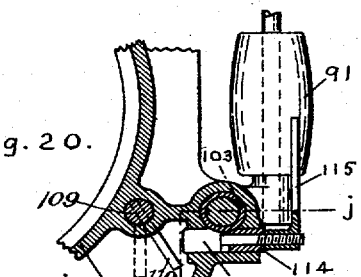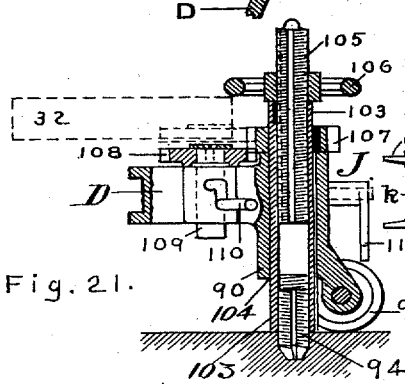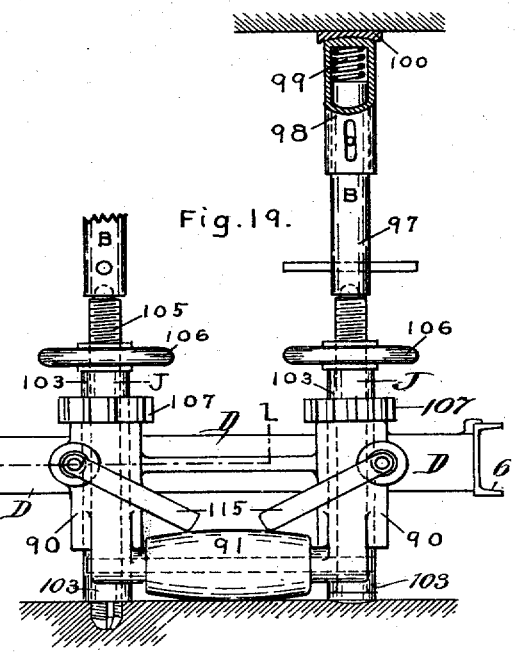

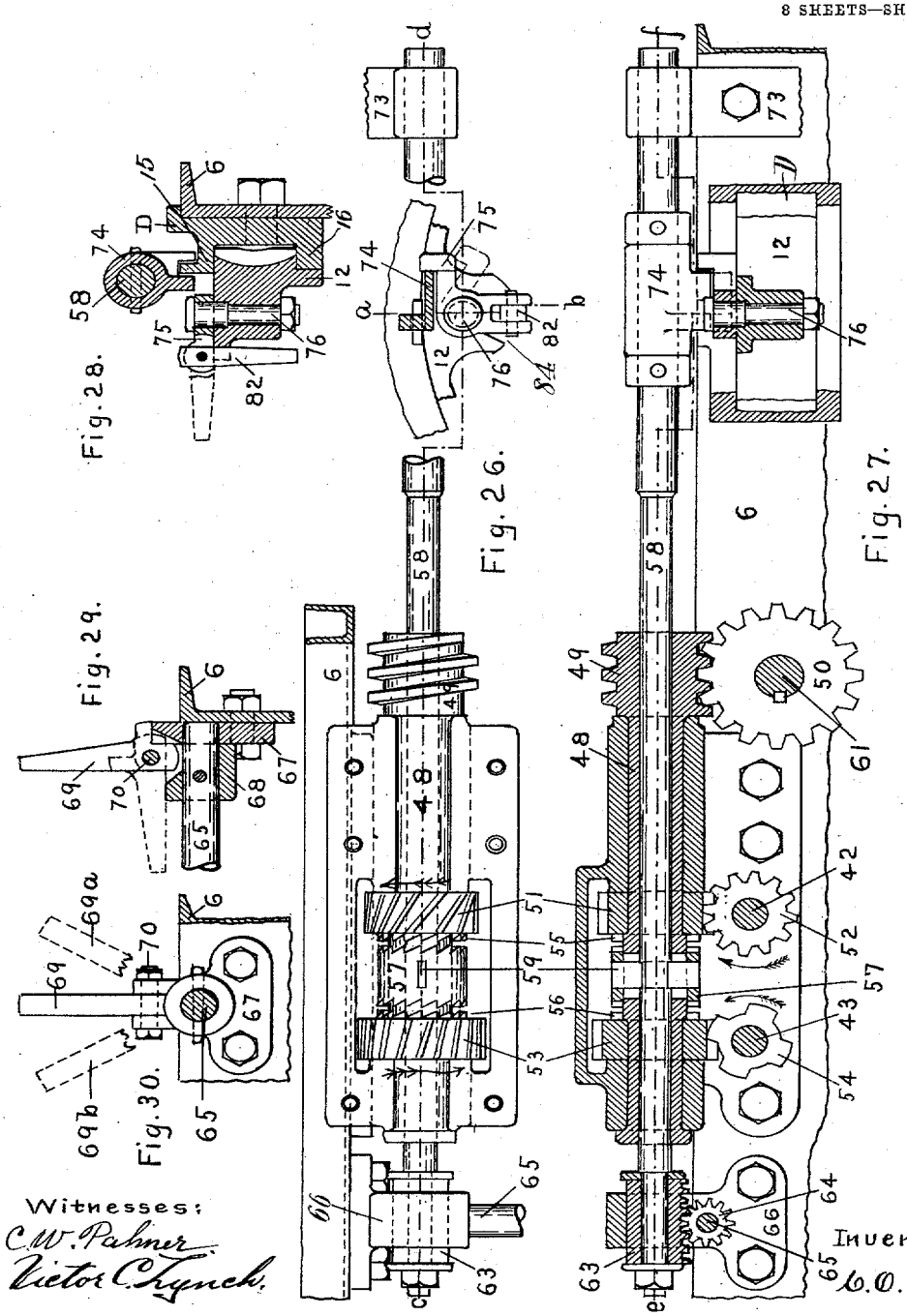

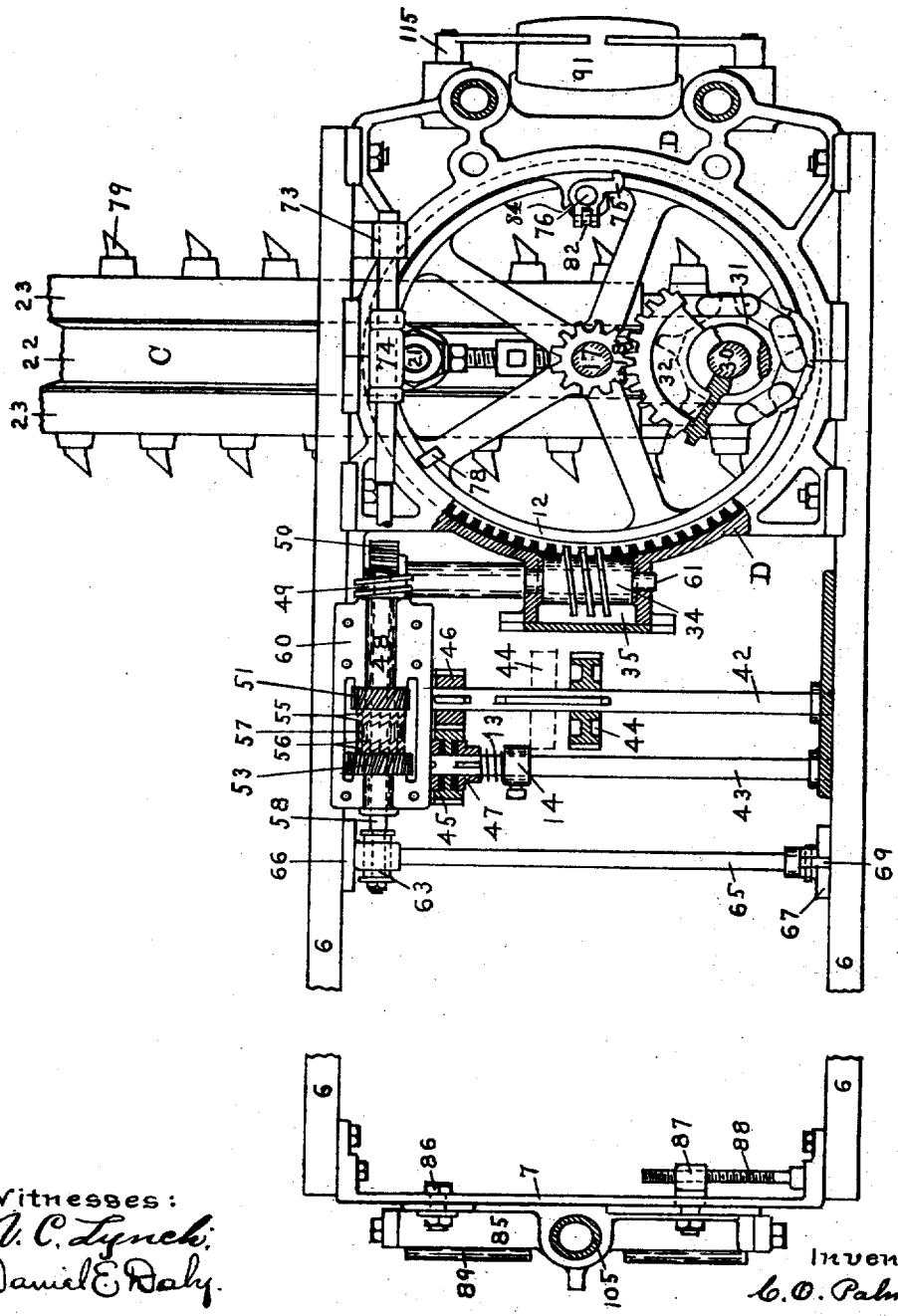

UNITED STATES PATENT OFFICE.

CHARLES OTIS PALMER, OF CLEVELAND, OHIO.

COAL-CUTTING MACHINE.

No. 800,478.  Specification of Letters Patent.  Patented Sept. 26, 1905.

Application filed October 15, 1901. Serial No. 79,124.

*To all whom it may concern:*

Be it known that I, CHARLES OTIS PALMER, a citizen of the United States, residing at Cleveland, in the county of Cuyahoga and State of Ohio, have invented certain new and useful Improvements in Coal-Cutting Machines, of which the following is a description, reference being had to the accompanying drawings, forming part of this specification.

The nature of the invention is as follows:

The invention relates to a coal-mining machine.

A general understanding may be obtained by a brief description.

The machine has a long narrow frame supported by one or more rollers on each end. A cutter-arm is journaled at one end and carries a cutter-chain, which is driven by means of an electric or other motor mounted on the frame. When the cutter-chain is not running, the cutter-arm lies under the frame.

Figure 1:
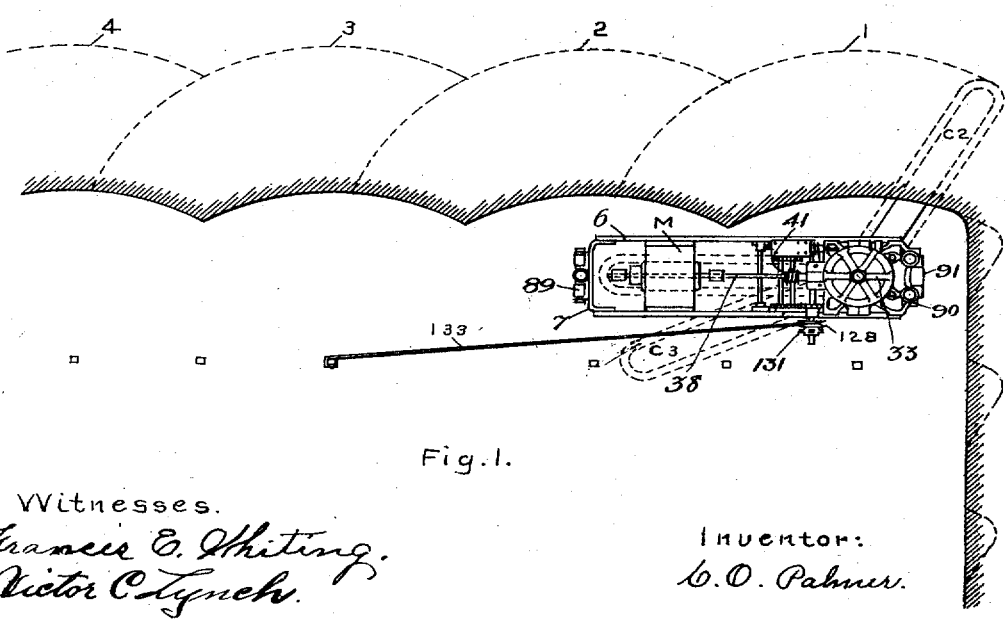

Previous to starting, the machine is placed alongside of and parallel to the working face, as shown in Figure 1, where it is anchored. The current now being switched on, the motor starts, driving the cutter-chain. By means of suitable feeding mechanism the cutter-arm is gradually turned horizontally on its journal to the position $C^2$, (shown in Fig. 1,) at the same time cutting a horizontal kerf beneath the coal up to the dotted line 1 of Fig. 1. The feeding mechanism is then reversed and the cutter-arm is returned to its starting position under the machine-frame. The anchors are then withdrawn and the machine is rolled longitudinally along the working face to a new position and the operation is repeated, cutting the kerf to the dotted line 2 of Fig. 1 and again to the lines 3 4, &c., until the end of working face is reached. The machine is then taken to another room.

Figure 13:
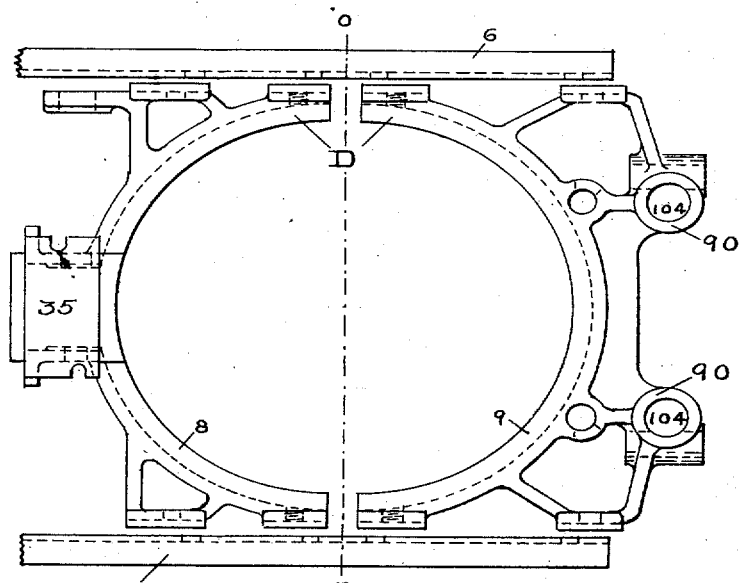
Figure 14:
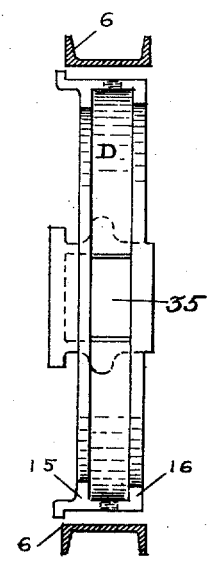

In the drawings, Fig. 1 is a plan of the corner of a mine-room, illustrating the mode of operating the machine. Fig. 2 is a section on line $y\,z$ of Fig. 3. Fig. 3 is a plan of the front end of the machine. Fig. 4 is a top view of the machine on line IV IV of Fig. 6. Fig. 5 is a section in line $u\,v$ of Fig. 4. Fig. 6 is a longitudinal section on line $s\,t$ of Fig. 4. Fig. 7 is a front end view of the machine. Fig. 8 is a top view of the cutter-arm attached to the worm-wheel. Fig. 9 is a longitudinal section of Fig. 8, including also some adjacent parts. Fig. 10 is a section in line $q\,r$ of Fig. 8. Fig. 11 is a top view of an antifriction-roller of Fig. 9. Fig. 12 is a side view of roller in Fig. 11. Fig. 13 is a top view of the turret-ring in detail, with the halves separated and with the side bars detached. Fig. 14 is a section in line $o\,p$ of Fig. 13. Fig. 15 is a vertical section of the disengaging mechanism of Fig. 6 when the driving-gear is out of engagement. Fig. 16 is a section on line $m\,n$ of Fig. 15. Fig. 17 is a top view and section of the washer of Fig. 15. Fig. 18 is a top view and section of the lifting-hook shown in Fig. 15. Fig. 19 is a rear end view of the machine. Fig. 20 is a section on line $k\,l$ of Fig. 19. Fig. 21 is a section on line $i\,j$ of Fig. 20, with parts of gear 108 broken away. Fig. 22 is a longitudinal section through the front floor-auger of my preferred form. Fig. 23 is a horizontal section on line $g\,h$ of Fig. 22. Fig. 24 is a side view of the auger-bit. Fig. 25 is an end view of Fig. 24. Fig. 26 is a top view of the knock-off mechanism on line $e\,f$ of Fig. 27. Fig. 27 is a longitudinal section of the knock-off mechanism on the line $c\,d$ of Fig. 26. Fig. 28 is a section on line $a\,b$ of Fig. 26. Fig. 29 is a section at the side of the starting-lever 69 of Fig. 4. Fig. 30 is a view of Fig. 29 from the left side. Fig. 31 is a side view of the auger-key. Fig. 32 is a section on line $w\,x$ of Fig. 22. Fig. 33 is a plan of the machine with certain parts broken away to illustrate the feeding mechanism. Fig. 34 is a top view of a part of Fig. 26, showing the dog 75 when turned to the disengaging position.

Similar characters refer to similar parts throughout the several views.

The machine has a low rectangular frame consisting of two side bars 6, secured together on the front end by the end bar 7 and on the rear end by the turret-ring D, formed in two pieces 8 and 9. (See Fig. 13.) Journaled within the ring D is the turret worm-wheel 12. The turret-ring (see Fig. 14) has a flange 15 formed on the inside above and a flange 16 below the worm-wheel to keep it in place, and the ring is made in halves, which are held together and in place by the side bars 6, to which they are bolted. The bearing of the worm-wheel is preferably made on the inside of the lower flange 16. By making the turret-ring in halves and forming flanges on the inside of the ring above and below the worm-wheel the machine is made lighter and the height is reduced over the construction shown in my former patent, No. 594,898, of December 7, 1897.

The friction of the lower flange 16 of Fig.

14 may be relieved by inserting rollers 11 (see Fig. 9) between it and worm-wheel 12 and casting a flange underneath the rollers to keep them in position.

Passing vertically through the hub of the worm-wheel 12 is the center stud 17, having center pinion 18 and the gear-wheel 33 journaled on the upper end. On the under side of worm-wheel 12 (see Figs. 8 and 9) is the cutter-arm C, to which it is secured by the center stud 17 and the bolt 21. The cutter-arm (see Fig. 10) is constructed of an I-shaped beam 22 placed on its side and having the cutter-chain guides 23 secured to its flanges. Attached to the chain-guides 23 (see Figs. 8 and 9) is the plate-holder 24, to which are secured the sprocket-wheel plates 25. The chain sprocket-wheel 26 is journaled between plates 25 on screw 27, as shown in Figs. 8 and 9. By making the guides 23 separate from the beam 22 the guides may be replaced when worn out, while the beam 22 still answers for the new guides. The holes in the beam 22 for the stud 17 and bolt 21 are elongated, so that the cutter-arm C may be elongated to take up the wear of the cutter-chain. In order to adjust and hold the cutter-arm in position, a stud 28 is secured to the cutter-arm C and has a threaded hole through it parallel with the cutter-arm. Passing through this hole and abutting against the hub and boss of turret worm-wheel 12 is the adjusting-screw 29, which is prevented from turning by the set-screw on the upper end of stud 28. Passing vertically through the worm-wheel 12 in line with the cutter-arm is the shaft 30, to the lower end of which is secured the sprocket-wheel 31, that carries the cutter-chain, and to the upper end is secured the sprocket shaft-gear 32, that engages the center pinion 18. For convenience in manufacturing the center gear 33 is secured in the shank of the center pinion. Teeth are formed on the periphery of worm-wheel 12, (see Fig. 6,) which engage with worm 34, which is situated in the housing 35 on the exterior of turret-ring D. On the top of said housing is bolted the journal-box 36 (see Fig. 6) of the motor-shaft 38.

The electric motor M, which is situated near the forward end of the machine, is secured to insulating-blocks 37 of Fig. 4, which are in turn bolted to the side bars 6. Near the end of the motor-shaft 38 and adjoining the journal-box 36 is the motor-pinion 39, that engages the center gear 33. Formed on the motor-shaft 38 (see Figs. 4 and 6) is the worm 41, which operates the feeding mechanism through the transverse shafts 42 and 43. On shaft 42 (see Fig. 4) is secured worm-wheel 44, which engages worm 41. Shaft 43 is operated through the spur-gears 46 and 45. On the back side of the frame (see Figs. 4, 26, and 27) is journaled the longitudinal feed-shaft 48, near one end of which is formed worm 49, that engages worm-wheel 50. Revolving loosely on the longitudinal feed-shaft 48 is the spiral gear 51, that engages gear 52 on shaft 42, and on shaft 43 is gear 54, that engages gear 53, that revolves loose on shaft 48. The gears 51 and 53 revolve continuously in opposite directions and are provided on their sides with clutch-teeth 55 and 56, respectively, as shown in Figs. 26 and 27. Sliding loosely on shaft 48 between gears 51 and 53 is the sleeve 57, having clutch-teeth in each end for engaging the clutch-teeth of gears 51 and 53. The clutch-sleeve is made to rotate in one or the other direction by engaging the gears 51 or 53. The sleeve 57, the longitudinal feed-shaft 48, and the clutch-rod 58 in the center of shaft 48 are slotted longitudinally to admit a cotter 59, which not only serves to slide the sleeve 57 into engagement, but to prevent it rotating on its shaft.

To feed the cutter-arm to its work, the clutch-teeth 56 (see Fig. 26) are engaged as hereinafter explained, and the rotation of the motor-shaft 38 (see Fig. 4) is transmitted through worm 41, worm-wheel 44, (see Fig. 6,) shaft 42, gears 46 and 45, (see Fig. 4,) shaft 43, spiral gears 54 and 53, (see Fig. 27,) clutch 56, sleeve 57, shaft 48, worm 49, worm-wheel 50, shaft 61, worm 34, (see Figs. 3 and 6,) and turret worm-wheel 12, to which the cutter-arm C is attached. The cutter-arm C having swung to the extent of its cut, as shown in the position $C^2$ of Fig. 1, the automatic return of the cutter-arm C is made by sliding sleeve 57, as hereinafter explained, into engagement with clutch 55, (see Figs. 26 and 27,) when the motion of motor-shaft 38 instead of being transmitted through spiral gears 53 and 54 is transmitted through spiral gears 51 and 52, which reverses the direction of rotation of shaft 48, and consequently of the turret worm-shaft worm-wheel 50 and turret worm-wheel 12. When the clutch-sleeve 57 is in the middle position, as shown in the drawings, (see Figs. 26 and 27,) neither clutch 55 nor 56 is in engagement, so neither the automatic feed nor the automatic return is in operation.

As shown in Fig. 5, the gear 45 revolves loosely on shaft 43 between flange 40, which is keyed on its shaft, and 47, which is prevented from turning by a feather. Adjoining flange 47 is spring 13, whose compression is regulated by the position of collar 14. Leather washers are interposed between flanges 40 and 47 and the gear 45. The compression on these leathers regulates the amount of torsion transmitted from gear 45 to shaft 43, so that if the cutters should strike an obstacle or for other reason require more power to feed the cutter-arm than can be transmitted through the friction the feed is stopped and injury to the machine is prevented. The spring 13 allows a greater range of adjustment of the collar 14, and hence is easier to set in the desired position.

For convenience in operating the feed-clutches by hand I have the following mechanism: Clutch-rod 58 (see Figs. 33, 26, and 27) has a rack 63 on the front end that is operated by pinion 64 on shaft 65, that is held in position by the rack-block 66 on the back side and by block 67 (see Fig. 4) on the front side. Pinned on starting-shaft 65 is block 68, which holds the feed-lever 69 by the bolt 70. (See Figs. 29 and 30.) To start the automatic feed, the feed-lever 69 is turned to the dotted position 69$^a$ in Fig. 30 and for the automatic return to the dotted position 69$^b$ in the same figure. When the lever 69 is in the position shown in solid lines in Fig. 30, neither the feed nor return mechanism is in operation. When moving the machine, it is necessary to have the cutter-arm C remain stationary, so the lever 69 is turned to the dotted position in Fig. 29, where it is locked by the lower end of the lever engaging the slot of the piece 67. (Shown in said figure.)

In order to automatically disengage the clutches 55 and 56 when the cutter-arm has reached the extreme positions, the end of the feed-rod 58 is continued to the worm-wheel 12, where it is supported in bearing 73. (See Fig. 4.)

A pendant 74 of Figs. 33, 26, 27, and 28 turns loosely on the feed-rod 58 between two collars. The pendant is forked at the lower end (see Fig. 28) and straddles a projection on the turret-ring, which, while allowing longitudinal motion, prevents its transverse movement. To the turret-worm 12 is attached the dog 75 (see Fig. 26) by the stud 76, so that as the cutter-arm C is returned from the outward position C$^2$ (shown in Fig. 1) to the inward position (shown in Fig. 4) the dog 75 engages the pendant 74 (see Figs. 26 and 33) and moves it, together with the clutch-rod 58, longitudinally, thus disengaging clutch 55 and stopping the return movement of the cutter-arm. A stop 77 (see Fig. 4) is formed on the turret worm-wheel 12, that engages the pendant 74, and disengages clutch 56 when the cutter-arm C has reached its extreme outer position. (Shown in Fig. 1.)

It is often more convenient to set the cutter-bits 79 (see Fig. 33) from the front side of the machine, in which case the cutter-arm is swung to the front of the machine to the position C$^3$ of Fig. 1. To do this, the latch 82 of the dog 75 is swung to the dotted position shown in Figs. 28 and 34 by disengaging it from slot 83 of Fig. 8, and after turning the dog 75 to the position shown in Fig. 34 the latch is dropped into the side slot 84 of Fig. 8. The dog 75 is then out of position for engaging the pendant 74, and the worm-wheel 12 continues to rotate until the pendant 74 is engaged by the stop 78, (see Figs. 4 and 8,) thereby disengaging the clutch 55 of Fig. 27 and stopping the rotation of the cutter-arm. The starting of the rotary feed motion is done by operating lever 69 by hand, as already explained.

To accommodate the height of the cutter-arm to the inequalities of the floor, the machine-frame may be tilted up to the position shown in dotted lines in Fig. 7 or downward in the opposite direction, as will be now explained. To the front of the end bar 7 is bolted the roller-carrier 85, in Fig. 7, by bolt 86 (which also acts as a pivot on which it turns) and by the bolt 87. The end piece 7 is slotted horizontally, as shown in dotted lines in Fig. 7, for bolt 87, and the roller-carrier 85 is slotted diagonally for the same bolt 87. The head of bolt 87 is tapped to receive the adjusting-screw 88, (see Fig. 4,) which passes through the side bar 6 and engages it. The adjusting-screw is prevented from endwise motion by a collar on each side of the side bar 6. By turning the adjusting-screw 88 the bolt 87 is moved in the respective slots just mentioned to the dotted position shown in Fig. 7, and the end piece 7 assumes the dotted position in said figure. By turning the adjusting-screw in the opposite direction the machine-frame is tilted in the opposite direction. A hole for the floor-auger is formed in the middle of the roller-carrier, and a roller 89 is held on each side of it, as shown in Fig. 7.

In the rear end of the machine are formed tubes 90 (see Fig. 13) for the reception of two floor-auger shanks. The rear end of the machine rests on the roller 91, (see Fig. 19,) which is supported by and between the said tubes 90. This roller 91 is made larger in the middle to allow the machine to accommodate itself to the position of the front roller when the frame is inclined, as already explained.

When in the cutting position, the machine is held from sliding by an anchor on each end of the machine, which rests in a hole in the floor. In my preferred form the anchor consists of a floor-auger J, having a cylindrical shank 103 with an auger-bit 94 in the lower end, which makes a hole in the floor, wherein the auger may extend to form an anchor for holding the machine in position.

When the anchor is long, no brace to the roof is necessary, as the weight of the machine is sufficient to keep it down; but when the anchor is short additional holding power is desirable, and I prefer to obtain it by a jack-screw 105 and brace leading to the roof. The brace most essential is the outer one on the rear end of the machine.

The auger-shank 103 is made in the form of a tube which loosely fits in the socket 104 of Fig. 13. Its lower end is threaded and splined in the inside to engage the auger-bit 94. There is also a feather on the upper end on the inside engaging screw 105 and a keyway on the outside engaging the auger-gear 107. Jack-screw 105 with a longitudinal keyway slides loosely within the auger-shank and engages the shank-feather. A threaded hand-wheel 106 rests on the auger-shank and engages the jack-screw 105. An auger-gear 107 slides longitudinally on the auger-shank 103 and has a feather engaging the spline in said auger-shank, by which it is driven.

As shown in Fig. 4, the auger-gear 107 is driven from gear 32 through the idler 108. The idler 108 revolves loosely on the stud 109 and when in engagement occupies the position shown in dotted lines of Fig. 21. Passing through stud 109 is the handle 110, that passes through a slot in the frame, as shown in Fig. 21. Handle 110 serves to raise the idler-gear 108 to its working position, where it is locked by turning the handle to the left in the top end of the slot.

The floor-auger bit detailed in Figs. 24 and 25 is threaded and splined on the outside and has cutting edges on the end. It is screwed into and keyed in the lower end of the shank 103 by the key 95 of Fig. 31. The thread serves to take the vertical thrust, while the key serves to take the torsion of boring. When the brace B is used, the pressure of the auger against the floor is produced by turning the hand-wheel 106 on the screw 105. When the brace B is not used, sufficient pressure for boring is got by bearing down on the top of the auger by pressing on the hand-wheel 106.

When the auger-bit has been ground short by sharpening, it is lengthened by unscrewing it the requisite amount.

The extension-brace B may be simply a wooden post with the ends sawed off square; but I prefer that shown in Fig. 19. The brace here shown comprises a post 97, having a telescopic cap 98, which slides on the top end, and a spring 99 is interposed between the post and the hollow cap. A rubber cushion 100 on the end of the brace secures an even bearing against the roof and prevents slipping. This elastic brace maintains a pressure against the screw even when the floor yields somewhat to the pressure against it.

The machine is set at the desired elevation and inclination to cut the kerf. Then the holes are drilled in the floor, and the machine is anchored, the rear end braces in the meantime being set tightly against the roof by the hand-wheels 106 without danger of changing the position of the machine. A turn of the clamp-handles 115 then secures the machine-frame to the auger-shank without straining the frame or altering its position.

The ordinary mining-machine jack presses the supporting-frame against the floor, thereby changing its setting and distorting the frame and without indenting the floor, as my construction does, and hence with less holding power.

The clamp in my preferred form has two cylindrical blocks 113 and 114, (see Fig. 20,) which slide horizontally in the frame. Block 114 is hollow, and through its center passes the threaded end of 113. The clamp-handle 115 screws onto the block 113, thus forcing it and 114 against the shank 103 of the floor-auger and securing it to the machine-frame. It is obvious that other well-known forms of clamps, as a set-screw or a split clamp, would answer the same purpose. When so desired, the clamp may also be used to hold the auger up so it is clear of the floor.

The boring in the floor may be done by hand instead of by power, as shown in Figs. 6 and 7, where the auger is turned by the hand-wheel 112, which is secured on the auger-shank 103 by a set-screw or preferably a taper key.

In order to raise the auger clear of the floor while the machine is being moved from one cutting position to another, it is supported on a spiral spring 111, (see Figs. 6 and 7,) placed between the machine-frame and the said hand-wheel 112. Time is saved, however, by using power for boring, and this is done by the arrangement shown in Figs. 2 and 3, also 22 and 23, where an auger-gear 120 with a feather on the inside slides on the auger-shank 103 and engages the spline on same. A spiral gear 121 is splined on the motor-shaft 38 and engages spiral gear 122, which engages 123, and it in turn engages 120, and so turns the front-end floor-auger. The gear 121 may be disengaged by sliding it to the dotted position shown in Fig. 22, where it remains while the chain is cutting. The gear 121 on the motor-shaft is kept in its engaged or disengaged position by means of the latch 125, (see Figs. 2 and 3,) which is hinged on the stud 124, on which it slides to the position shown in said figures.

To utilize the power of the motor for moving the machine, the pulley-shaft 126 (see Fig. 4) is supported in bearings by the journal-box 36 and the side-bar journal 127. On the pulley-shaft 126 is secured the gear 129, that engages gear 130 on shaft 42 and from which it derives its motion. Secured on pulley-shaft 126 is pulley 128.

When from the nature of the floor the machine is not easily rolled from one cutting position to another, the power of the motor may be utilized for this purpose, as follows: A hauling-rope 133 in Fig. 1 has one end attached to a prop or some other stationary object and the other end passed half around the grooved pulley 128. The sides of the groove are inclined to give the requisite friction of the rope, the loose end of the rope being taken up by the operator. Heretofore a drum has been used for hauling the machine and the rope given several turns around same to give the requisite friction; but by substituting a grooved pulley with inclined sides therefor the lateral projection beyond the side of the machine is lessened and the width required for the machine to pass is thus considerably reduced, which is a material advantage in the narrow passages of the mine.

The center arm C may be operated by hand by a crank on the pulley-shaft 126, (see Figs. 4 and 5,) through the medium of gears 129 and 130 and shaft 42; but in this case the worm-wheel 44 must be slid out of engagement with worm 41 to the position shown in dotted lines in Fig. 5.

When the motor is used for moving the machine, it is safer not to have the cutter-chain driven by the motor. I disconnect the driving-gear by raising the center gear 33 from engagement with the motor-pinion 39. (See Fig. 6.) This is accomplished as follows, (see Figs. 15, 16, 17, and 18:) The center stud 17 has a tapped hole in the center of its upper end and a groove cut in its side in the upper half of its length. (See Figs. 15 and 16.) A center screw 144, having a collar and a hand-wheel 145 on its upper end, enters the threaded hole. A lifting-hook 146, having an eye on its upper end and a hook on its lower end, is fitted to slide in the groove of the center stud. The center screw passes through the eye of the lifter which rests on the collar of the screw. (See Fig. 15.) The lower end of the lifter is bent to project under the pinion 18, so that by turning the center screw 144 by the hand-wheel 145 the upward movement of the center screw 144 lifts the pinion 18, and hence the gear 33, out of engagement with the motor-pinion 39. When in the lower or driving position, the gear 33 is held down in close engagement with the motor-pinion 39 by the center screw 144 acting through the washer 147 on its upper side.

I have not described the motor, as it is substantially like other coal-cutter motors well known in the art and whose details are too well known to require mention. I might state, however, that it should be provided with means for reducing its speed while boring and during its transportation.

I have herein described the operation of the machine (see Fig. 1) as beginning on the right side of the room; but the cutting may equally well commence on the left side of the room and each successive cut be made at the right of the preceding one.

The terms "front" and "rear" of the machine are arbitrary and may be reversed.

I have not in this application claims covering completely the holding device here shown, as it forms the subject of my applications for mining-machines, Serial No. 134,717, filed December 10, 1902, and Serial No. 168,598, filed August 7, 1903.

Having thus described my invention, what I claim as new, and desire to secure by Letters Patent, is—

1. In a mining-machine, the combination, of a machine-frame having a turret-ring in one end, said ring being split vertically in halves and having an upper and lower inside flange formed integral with said turret-ring, a worm-wheel situated within said ring between said flanges and carrying a cutter-arm with a revolving cutter thereon.

2. The combination in a mining-machine, of a machine-frame, a turret worm-wheel journaled in the end of said frame and carrying the cutter-arm with a revolving cutter thereon, a transverse shaft carrying a worm engaging said turret worm-wheel, and a worm-wheel engaging a worm on a longitudinal feed-shaft, clutch-gears loosely mounted on said shaft, a sliding clutch-sleeve adapted to engage either of said gears, a knock-off rod engaging said sliding clutch, a stop on the turret worm-wheel operating the knock-off rod, means for revolving said clutch-gears, means for operating said cutter and means for holding the machine-frame in place.

3. The combination in a mining-machine, of a machine-frame, a worm-wheel journaled in said frame and carrying a cutter-arm with a revolving cutter thereon, a turret worm-shaft carrying a turret-worm and a worm-wheel 50, a longitudinal feed-shaft carrying a worm, and also the oppositely-revolving gears 51 and 53 respectively, having clutch-teeth, a sliding clutch-sleeve adapted to engage with either of said gears, a knock-off rod operating said sleeve, a hinged knock-off stop on the worm-wheel engaging the knock-off rod, means for revolving gears 51 and 52, means for revolving said cutter and means for holding said machine-frame in place.

4. The combination in a mining-machine, of a machine-frame, a worm-wheel journaled in said frame and carrying a cutter-arm with a revolving cutter thereon, a turret worm-shaft carrying a turret-worm 34 and worm-wheel 50, a longitudinal feed-shaft carrying worm 49 and also two oppositely-revolving gears 51 and 53 respectively, having clutch-teeth on one side, a sliding clutch-sleeve adapted to engage either of said gears, a knock-off rod operating said sleeve, a hinged knock-off stop on the worm-wheel engaging the knock-off rod, friction-gear 45, means for rotating said gear 45, means for operating said cutter, and means for holding said machine-frame in place.

5. The combination in a mining-machine, of a machine-frame, a worm-wheel journaled in said frame and carrying a cutter-arm with a revolving cutter thereon, a turret worm-shaft carrying a turret-worm 34 and worm-wheel 50, a longitudinal feed-shaft carrying worm 49, two gears loosely mounted on said shaft, a clutch device for securing either of said gears to said shaft, a knock-off rod operating said sleeve, a hinged knock-off stop on the worm-wheel engaging the knock-off rod, feed friction-gear 45, means for rotating said gear, a rack on the knock-off rod, a pinion engaging the rack, and means for rotating said pinion, substantially as described.

6. The combination in a mining-machine, of a machine-frame, a cutter-arm carrying a horizontally-revolving cutter journaled in one end of the frame, a motor for actuating said cutter, a roller-carrier adjustably swiveled on the end of the frame, an auger mounted to rotate on said roller-carriage, an auger-bit in the bottom end of said auger, a gear on said auger, gears connecting said auger-gear with the motor-shaft substantially as set forth.

7. The combination in a mining-machine, of a machine-frame, a worm-wheel journaled in said frame and carrying a revolving cutter, a motor on the machine-frame, a beveled pinion on the motor-shaft, a hub in said worm-wheel, a stud in said hub, a beveled gear journaled on said stud and engaging said beveled pinion and means for disengaging said gear and said pinion, substantially as described and for the purpose set forth.

8. The combination in a mining-machine, of a machine-frame, a worm-wheel journaled in said frame and carrying a revolving cutter, a motor on the machine-frame, a beveled pinion on the motor-shaft, a hub in said worm-wheel, a stud in said hub, a groove in the side of said stud, a threaded hole in the end of said stud, a flanged screw with handle engaging the said threaded hole, a beveled gear journaled on said stud and engaging said beveled pinion, a lifting-hook situated in said groove in said stud and engaging the flange on said screw at its upper end and the said beveled gear at its lower end, substantially as described for the purpose set forth.

9. The combination in a mining-machine, of a supporting-frame, a floor-auger mounted on said frame and adapted to be driven into the floor to form an anchor for retaining the machine in position, and means for turning said auger substantially as set forth.

10. The combination with a mining-machine, of its supporting-frame, a substantially vertical auger mounted thereon in position to be driven into the floor of the mine to form an anchor, motor mechanism and means for connecting and driving said auger thereby, substantially as set forth.

11. The combination with a mining-machine, of a supporting-frame, a rotatable auger-shank, an auger-bit on its lower end extending downward into the floor of the mine and adapted to form an anchor for holding said frame in position, and suitable means for rotating the auger substantially as set forth.

12. The combination in a mining-machine, of the supporting-frame, an auger-shank sliding loosely in said frame, a jack-screw within said auger-shank, a brace from said screw to the roof, and a clamp on said frame securing the frame and shank together substantially as set forth.

13. The combination with a mining-machine, of a supporting-frame, an auger sliding loosely in said frame, a jack-screw within said auger and a brace from said screw to the roof, a clamping device securing said frame to said drill comprising slidable blocks entering a hole in the frame and bearing against the auger, and a threaded handle engaging said blocks and pressing them against the auger, substantially as set forth.

Signed by me at Cleveland, Ohio, this 9th day of October, 1901.

CHARLES OTIS PALMER.

Witnesses:
VICTOR C. LYNCH,
DANIEL E. DALY.

---

It is hereby certified that in Letters Patent No. 800,478, granted September 26, 1905, upon the application of Charles Otis Palmer, of Cleveland, Ohio, errors appear requiring correction, as follows: The title of the invention should have been written and printed *Mining Machines* instead of "Coal-Cutting Machines," and on page 5, lines 58–59, of the printed specifications the number and date "Serial No. 134,717, filed December 10, 1902," should read *Serial No. 261,252, filed May 19, 1905;* and that the said Letters Patent should be read with these corrections therein that the same may conform to the record of the case in the Patent Office.

Signed and sealed this 10th day of October, A. D., 1905.

[SEAL.]

F. I. ALLEN,
*Commissioner of Patents.* ing the rack, and means for rotating said pinion, substantially as described.

6. The combination in a mining-machine, of a machine-frame, a cutter-arm carrying a horizontally-revolving cutter journaled in one end of the frame, a motor for actuating said cutter, a roller-carrier adjustably swiveled on the end of the frame, an auger mounted to rotate on said roller-carriage, an auger-bit in the bottom end of said auger, a gear on said auger, gears connecting said auger-gear with the motor-shaft substantially as set forth.

7. The combination in a mining-machine, of a machine-frame, a worm-wheel journaled in said frame and carrying a revolving cutter, a motor on the machine-frame, a beveled pinion on the motor-shaft, a hub in said worm-wheel, a stud in said hub, a beveled gear journaled on said stud and engaging said beveled pinion and means for disengaging said gear and said pinion, substantially as described and for the purpose set forth.

8. The combination in a mining-machine, of a machine-frame, a worm-wheel journaled in said frame and carrying a revolving cutter, a motor on the machine-frame, a beveled pinion on the motor-shaft, a hub in said worm-wheel, a stud in said hub, a groove in the side of said stud, a threaded hole in the end of said stud, a flanged screw with handle engaging the said threaded hole, a beveled gear journaled on said stud and engaging said beveled pinion, a lifting-hook situated in said groove in said stud and engaging the flange on said screw at its upper end and the said beveled gear at its lower end, substantially as described for the purpose set forth.

9. The combination in a mining-machine, of a supporting-frame, a floor-auger mounted on said frame and adapted to be driven into the floor to form an anchor for retaining the machine in position, and means for turning said auger substantially as set forth.

10. The combination with a mining-machine, of its supporting-frame, a substantially vertical auger mounted thereon in position to be driven into the floor of the mine to form an anchor, motor mechanism and means for connecting and driving said auger thereby, substantially as set forth.

11. The combination with a mining-machine, of a supporting-frame, a rotatable auger-shank, an auger-bit on its lower end extending downward into the floor of the mine and adapted to form an anchor for holding said frame in position, and suitable means for rotating the auger substantially as set forth.

12. The combination in a mining-machine, of the supporting-frame, an auger-shank sliding loosely in said frame, a jack-screw within said auger-shank, a brace from said screw to the roof, and a clamp on said frame securing the frame and shank together substantially as set forth.

13. The combination with a mining-machine, of a supporting-frame, an auger sliding loosely in said frame, a jack-screw within said auger and a brace from said screw to the roof, a clamping device securing said frame to said drill comprising slidable blocks entering a hole in the frame and bearing against the auger, and a threaded handle engaging said blocks and pressing them against the auger, substantially as set forth.

Signed by me at Cleveland, Ohio, this 9th day of October, 1901.

CHARLES OTIS PALMER.

Witnesses:
VICTOR C. LYNCH,
DANIEL E. DALY.

---

It is hereby certified that in Letters Patent No. 800,478, granted September 26, 1905, upon the application of Charles Otis Palmer, of Cleveland, Ohio, errors appear requiring correction, as follows: The title of the invention should have been written and printed *Mining Machines* instead of "Coal-Cutting Machines," and on page 5, lines 58–59, of the printed specifications the number and date "Serial No. 134,717, filed December 10, 1902," should read *Serial No. 261,252, filed May 19, 1905;* and that the said Letters Patent should be read with these corrections therein that the same may conform to the record of the case in the Patent Office.

Signed and sealed this 10th day of October, A. D., 1905.

[SEAL.]

F. I. ALLEN,
*Commissioner of Patents.*

It is hereby certified that in Letters Patent No. 800,478, granted September 26, 1905, upon the application of Charles Otis Palmer, of Cleveland, Ohio, errors appear requiring correction, as follows: The title of the invention should have been written and printed *Mining Machines* instead of "Coal-Cutting Machines," and on page 5, lines 58-59, of the printed specifications the number and date "Serial No. 134,717, filed December 10, 1902," should read *Serial No. 261,252, filed May 19, 1905;* and that the said Letters Patent should be read with these corrections therein that the same may conform to the record of the case in the Patent Office.

Signed and sealed this 10th day of October, A. D., 1905.

[SEAL.]

F. I. ALLEN,
*Commissioner of Patents.*